(12) United States Patent
Adachi et al.

(10) Patent No.: US 6,357,812 B1
(45) Date of Patent: Mar. 19, 2002

(54) VEHICLE INTERIOR MATERIAL

(75) Inventors: Nagayoshi Adachi, Takarazuka; Tetsuo Mekata, Sanda; Kazushi Nakatani, Suita; Miwa Ishii, Kawanishi, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/634,373

(22) Filed: Aug. 7, 2000

(30) Foreign Application Priority Data

Aug. 9, 1999 (JP) .......................................... 11-225572

(51) Int. Cl.⁷ ............................................. B60R 21/02
(52) U.S. Cl. ....................... 296/39.1; 296/188; 296/189; 296/146.6; 296/146.7; 296/203.01; 296/203.03; 280/748; 280/751
(58) Field of Search ................................. 296/39.1, 188, 296/189, 146.6, 146.7, 203.08, 203.01; 280/748, 751, 752

(56) References Cited

U.S. PATENT DOCUMENTS

| | | | |
|---|---|---|---|
| 5,660,426 A | | 8/1997 | Sugimori et al. ............ 296/189 |
| 5,709,407 A | | 1/1998 | Stephens et al. ............ 280/751 |
| 5,741,044 A | * | 4/1998 | Kawai et al. ............. 296/203.3 |
| 5,833,303 A | * | 11/1998 | Kawai et al. ............... 296/189 |
| 5,927,786 A | * | 7/1999 | Kawai et al. ............... 296/39.1 |
| 6,050,631 A | * | 4/2000 | Suzuki et al. ............... 296/189 |
| 6,059,342 A | * | 5/2000 | Kawai et al. ............... 296/39.1 |
| 6,126,231 A | * | 10/2000 | Suzuki et al. ............... 296/189 |
| 6,247,287 B1 | * | 6/2001 | Takabatake ............. 296/188 X |

* cited by examiner

Primary Examiner—Stephen T. Gordon
Assistant Examiner—Lori L. Coletta
(74) Attorney, Agent, or Firm—Armstrong, Westerman & Hattori, LLP

(57) ABSTRACT

A vehicle interior material is provided that efficiently dampens impact forces with ribs protruding into a limited space enclosed by a vehicle panel and a facer, and that reduces the protrusion height of the ribs, thereby curbing the amount that the vehicle interior material bulges into the space of the vehicle interior. The vehicle interior material includes a facer (2) with a substantially C-shaped cross-section covering a panel ridge (7) extending in a longitudinal direction on the vehicle compartment side of a vehicle panel, a space (4) being provided between the panel ridge and the facer; and a plurality of plate-shaped ribs (3) which are arranged independently from one another, bridging side walls of the facer, the ribs protruding from a rear face of the facer (2) opposite the vehicle panel into the space (4) and arranged at substantially right angles with the longitudinal direction of the vehicle panel. The shape of a protruding edge of the plate-shaped ribs (3) substantially follows at least a protrusion end face of the panel ridge (7) and the passenger-opposing lateral face formed in continuation thereof to one side. The vehicle interior material further includes a deformation-inducing means (30) causing a rib portion (3B) protruding towards the protrusion end face of the panel ridge (7) to buckle at an intermediate protrusion position when subjected to an impact by a passenger.

6 Claims, 14 Drawing Sheets

Passenger position

Vehicle compartment side

Fig. 3
(a)
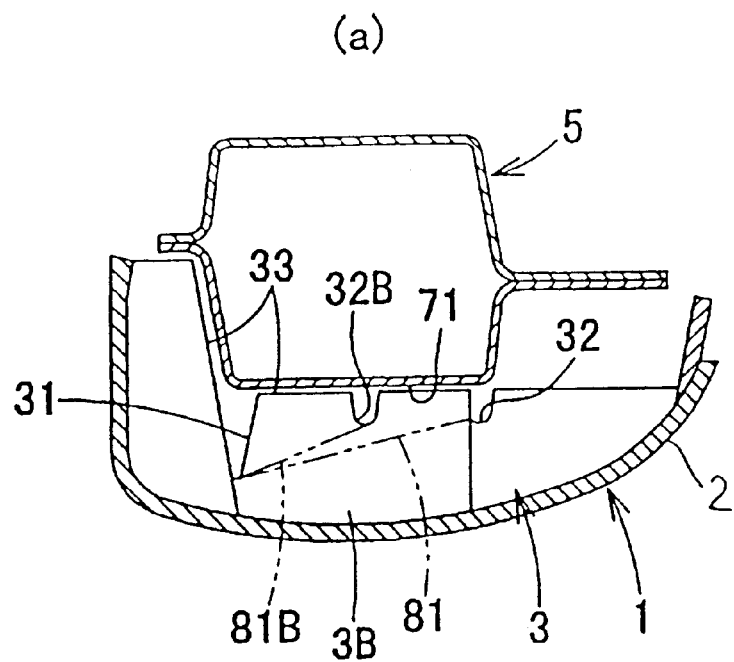
(b)
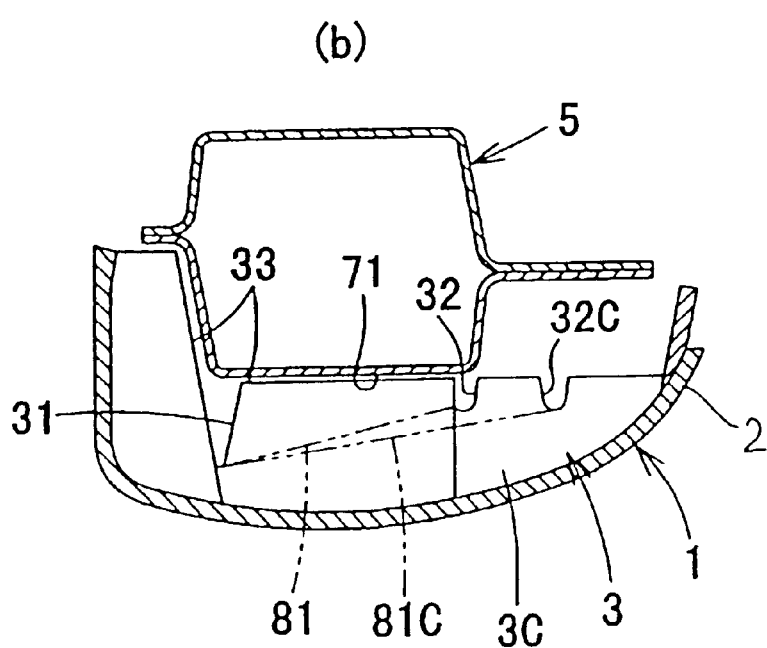

Fig. 4
(a)
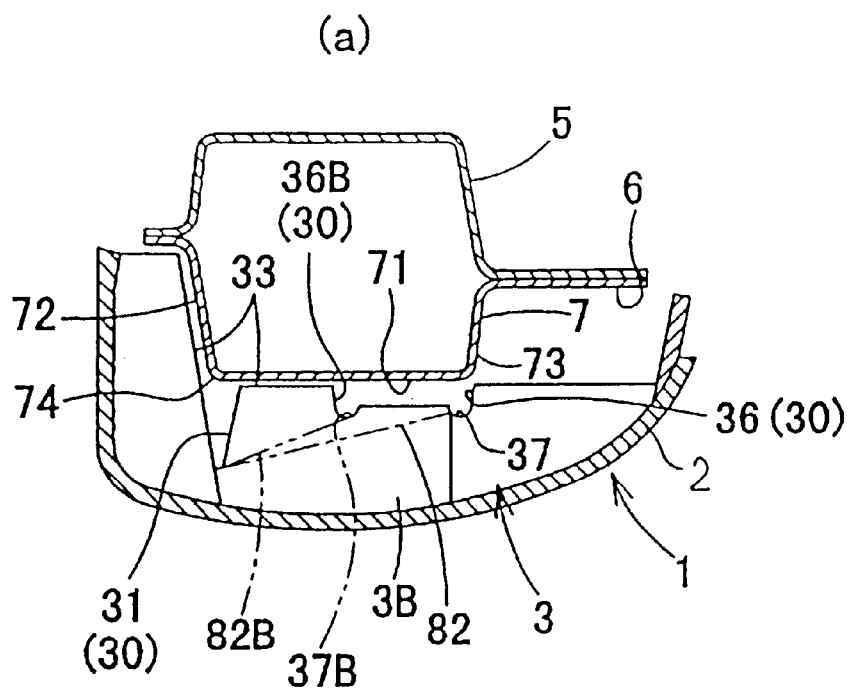
(b)
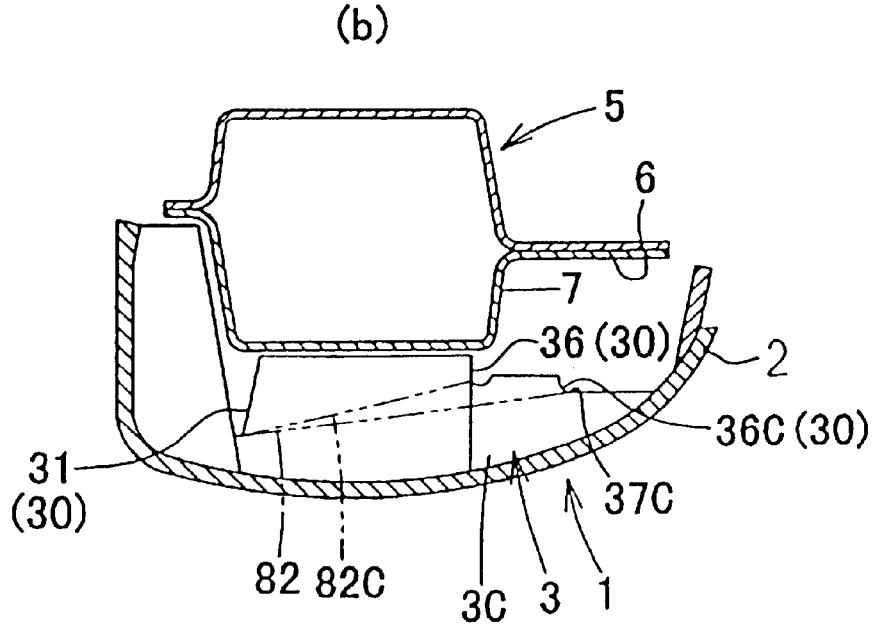

Fig. 5
(a)
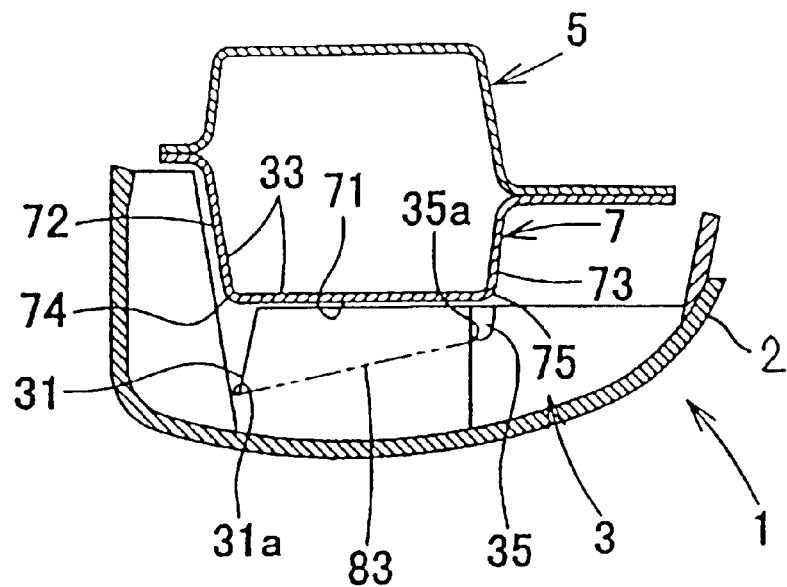
(b)
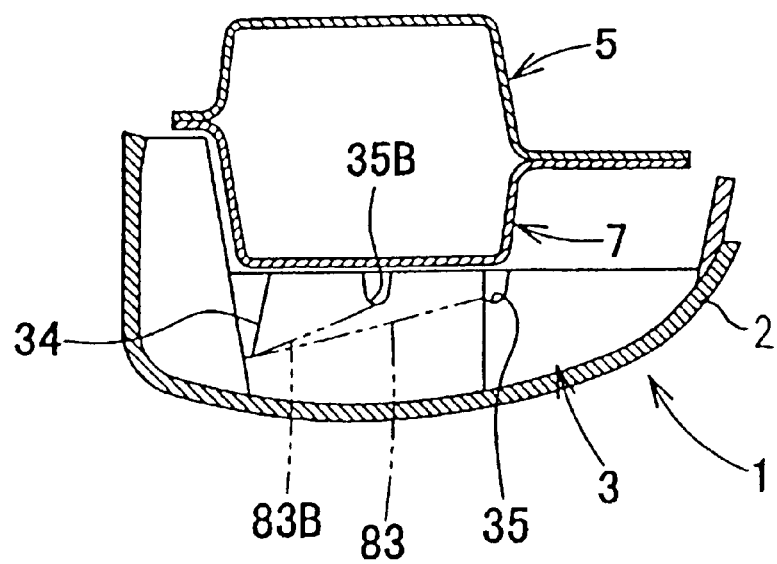

Fig. 14                                                                 Prior Art
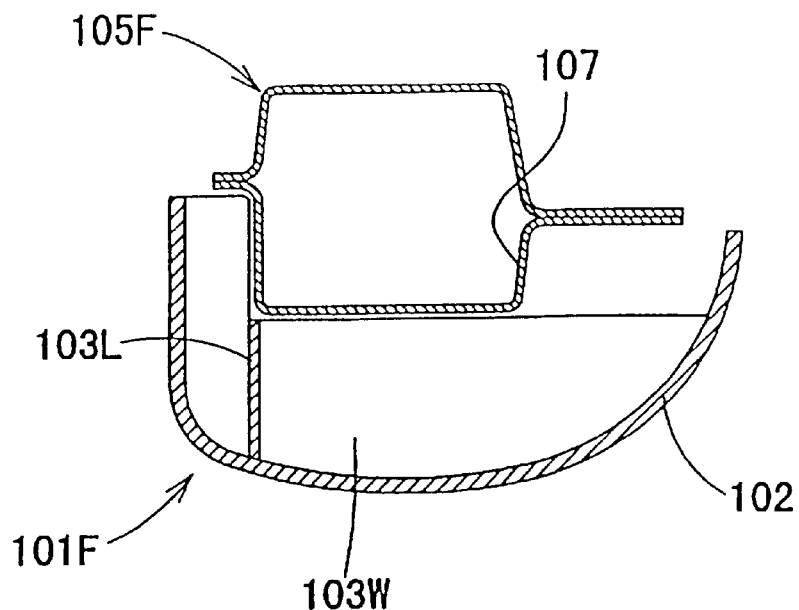
Fig. 15
Prior Art
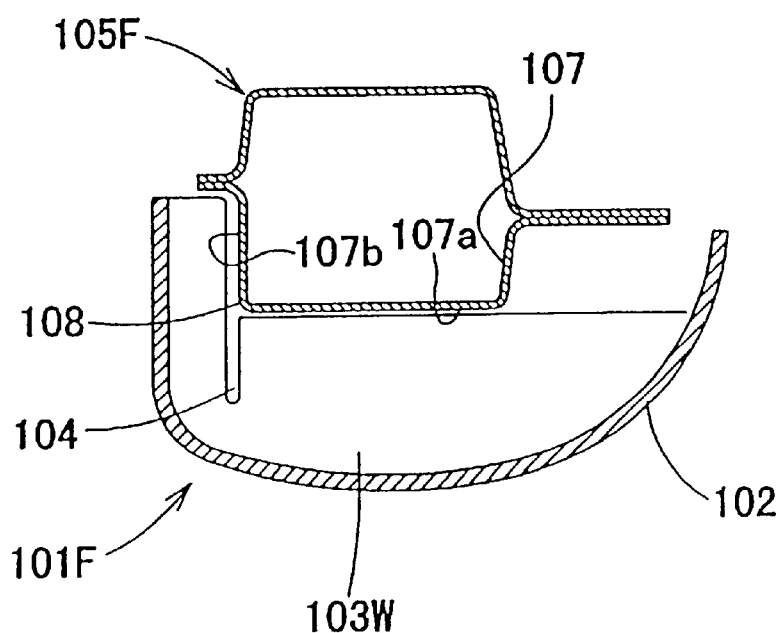

VEHICLE INTERIOR MATERIAL

BACKGROUND OF THE INVENTION

1. Field of the Invention

The present invention relates to a vehicle interior material, and more specifically, to a vehicle interior material employed on the vehicle compartment side of a vehicle panel, such as a front pillar or a roof side rail of an automobile.

2. Description of the Related Art

As shown in FIG. 13 this kind of vehicle interior material is used for example for a front pillar garnish 101F or a roof side rail garnish 101S employed on the vehicle compartment side of a vehicle panel, such as a front pillar 105F or a roof side rail 105S of an automobile 100. Besides aesthetic reasons with regard to the vehicle compartment, these vehicle interior material are used because they can deform plastically when directly hitting a portion (e.g. the head) of a passenger's body, for example in the course of a collision of the vehicle, so that the impact force inflicted on the passenger from outside the vehicle can be absorbed and dampened.

As shown in FIG. 14, a conventional front pillar garnish 101F, as disclosed for example in JP H9-175284A1 includes a facer 102 with a substantially C-shaped cross-section, a plate-shaped vertical rib 103L extending in the longitudinal direction on the rear side of the facer 102, and a plurality of also plate-shaped horizontal ribs 103W, intersecting at substantially right angles with the vertical rib 103L and bridging the walls on the two sides of the facer 102. The front pillar garnish 101F is fastened with the ribs being in contact with a protruding bar 107 of the inner panel that is part of the front pillar 105F.

However, with a front pillar garnish 101F having, as described above, a lattice structure made of a vertical rib 103L and a plurality of horizontal ribs 103W in the space on the rear side of the facer 102, the vertical rib 103L and the horizontal ribs 103W overlap when deforming and breaking down during an impact, and the height of the space that is provided mainly for the dampening of impacts (that is, the shock-absorbing stroke) is diminished by that amount. Thus, in order to maintain the high shock-absorbing capabilities verified by the head impact index according to U.S. standard FMVSS 201, it becomes necessary to increase the protrusion height of the ribs. Consequently, when the front pillar garnish 101F is attached to the front pillar 105F, the front pillar garnish 101F takes up more space of the vehicle compartment, which leads to the problems of a feeling of pressure on behalf of the passengers, an obstruction of the visual range, and an encumbrance when entering or leaving the vehicle.

JP H10-203278A1 discloses a front pillar garnish 101F wherein the vertical rib is eliminated from the rear side of the facer 102 covering the protruding bar 107 of the front pillar 105F, as shown in FIG. 15. Moreover, notches 104 opened in opposition to the region 108 where the protrusion end face 107a of the protruding bar 107 abuts the passenger-opposing lateral face 107b formed in continuation on one side thereof are formed in horizontal ribs 103W that are arranged independently.

With such a front pillar garnish 101F in which the vertical rib has been eliminated, the decrease of the impact absorption stroke due to overlapping of the ribs as described above can be prevented, the notches 104 provided in the horizontal ribs 103W absorb the impact force while forming cracks originating at the bottom portions of the notches and extending toward the facer 102, and the entire ribs buckle and absorb the impact, so that the shock-absorbing capabilities are better than when the horizontal ribs are not provided with notches 104. As a result, the protrusion height of the ribs can be decreased, and the amount that the front pillar garnish 101F bulges into the vehicle interior can be diminished.

However, in the front pillar garnish 101F as shown in FIG. 15, which attempts to absorb the impact by providing one notch 104 at a position opposing the passenger and primarily receiving the impact, and forming a crack originating at the bottom portion of this notch 104 as described above, there is a certain limit to the increase of shock-absorbing capabilities due to the selection of the material, and it is not possible to reduce the maximum protrusion height of the ribs to less than about 18 mm.

Conventionally, various contrivances have been employed to increase the shock-absorbing capabilities, such as providing the rear side of the pillar garnish with a separate shock-absorbing cushion material, and molding the entire pillar garnish from a thermoplastic resin with excellent shock-absorbance, but these contrivances brought about the problem that as the down-side of increasing the shock-absorbing capabilities, the costs rise in the same degree.

SUMMARY OF THE INVENTION

The present invention has been contrived with this state of the art in mind, and it is an object of the present invention to provide a vehicle interior material that efficiently dampens impact forces with ribs protruding into a limited space enclosed by a vehicle panel and a facer, and that reduces the protrusion height of the ribs, thereby curbing the amount that the vehicle interior material bulges into the space of the vehicle compartment.

As the result of concerted efforts to solve the aforementioned problems, the inventors have recognized that high shock-absorbing capabilities can be maintained in a limited space by eliminating the vertical ribs that are conventionally employed for pillar garnishes and using a configuration that can be logically deformed or buckled when a passenger exerts an impact on the horizontal ribs, thereby arriving at the present invention.

In other words, the present invention provides a vehicle interior material including a facer with a substantially C-shaped cross-section covering a panel ridge on the vehicle compartment side of a vehicle panel, the panel ridge having a protrusion end face extending in a longitudinal direction and two lateral faces in continuation of the end face, a space being provided between the panel ridge and the facer; and a plurality of ribs, which are arranged independently from one another, bridging side walls of the facer, the ribs protruding from a rear face of the facer opposite the vehicle panel into the space and intersecting with the longitudinal direction of the vehicle panel;

wherein the shape of a protruding edge of the plate-shaped ribs substantially follows at least a protrusion end face of the panel ridge and the passenger-opposing lateral face formed in continuation thereof to one side; and wherein the vehicle interior material further comprises a deformation-inducing means, causing a portion of the plate-shaped ribs protruding towards the protrusion end face of the panel ridge to buckle at an intermediate protrusion position when subjected to an impact by a passenger.

With such a vehicle interior material, the plate-shaped ribs are independent from one another, so that the decrease of the actual impact absorption stroke due to overlapping of the ribs can be prevented, while the deformation-inducing means with which the ribs are provided cause multi-stage deformation and break-down starting the buckling at an intermediate portion of the ribs before the ribs buckle along the protrusion base end, the protrusion height of the plate-shaped ribs can be curbed and the plate-shaped ribs display efficient shock-absorbing characteristics maintaining a low impact acceleration.

When the deformation-inducing means includes a main notch opened in the protruding edge of the plate-shaped ribs in opposition to a region where the protrusion end face of the panel ridge abuts against the passenger-opposing lateral face formed in continuation on one side thereof, and one or more auxiliary notches provided in the protruding edge of the plate-shaped ribs in opposition to or nearly opposite the region where the protrusion end face of the panel ridge abuts against the lateral face formed in continuation on the other side thereof, then the buckling of the ribs is induced along a virtual line connecting a bottom portion of the main notch and a bottom portion of the auxiliary notch, or along a virtual line connecting the bottom portions of a plurality of auxiliary notches on which a large impact force is exerted, and the bottom portions of the main notch and the auxiliary notch(es) become the starting points for cracks towards the facer. The formation and progress of these cracks contributes to a more efficient shock absorbance.

When the deformation-inducing means includes a main notch provided in the protruding edge of the plate-shaped ribs in opposition to a region where the protrusion end face of the panel ridge abuts against the passenger-opposing lateral face formed in continuation on one side thereof, and one or more step portions provided in the protruding edge of the plate-shaped ribs in opposition to or nearly opposite the region where the protrusion end face of the panel ridge abuts against the lateral face formed in continuation on the other side thereof, then the buckling of the plate-shaped ribs is similarly induced along a virtual line connecting a bottom portion of the main notch and a bottom portion of the step portion, or along a virtual line connecting the bottom portions of a plurality of step portions on which a large impact force is exerted, and the bottom portions of the main notch and the step portion(s) become the starting points for cracks towards the facer.

When the deformation-inducing means includes a main notch provided in the protruding edge of the plate-shaped ribs in opposition to a region where the protrusion end face of the panel ridge abuts against the passenger-opposing lateral face formed in continuation on one side thereof, and one or more thin-walled portions provided in the protruding edge of the plate-shaped ribs in opposition to or nearly opposite the region where the protrusion end face of the panel ridge abuts against the lateral face formed in continuation on the other side thereof, then the impact is absorbed by the generation of cracks in the thin-walled portion(s), the buckling of the plate-shaped ribs is similarly induced along a virtual line connecting a bottom portion of the main notch and a bottom portion of the thin-walled portion, or along a virtual line connecting the bottom portions of a plurality of thin-walled portions on which a large impact force is exerted, and the bottom portions of the main notch and the thin-walled portion(s) become the starting points for cracks towards the facer.

When the vehicle interior material is provided with a thin-walled portion instead of the main notch, and the thin-walled portion has the same cross-section as the main notch, then impacts are absorbed by cracks occurring at the thin-walled portion, the buckling of the plate-shaped ribs is similarly induced along a virtual line connecting a bottom portion of the thin-walled portion with the bottom portion of the auxiliary notch, a bottom portion of the step portion or a bottom portion of another thin-walled portion, or along a virtual line connecting bottom portions of the same kind or the surroundings of bottom portions, and the bottom portion of the thin-walled portion, and the afore-mentioned bottom portions of the auxiliary notch, the step portion and the thin-walled portion become the starting points for cracks extending toward the facer.

When at least one virtual line extending from at least one structural portion of the deformation-inducing means toward the facer partitions the plate-shaped ribs into at least two portions of different thickness distribution along a protrusion direction and average thickness, then the shock absorbance characteristics of the plate-shaped ribs can be adjusted even freer, and impact forces can be dampened efficiently in the space limited by the vehicle panel and the facer. If the overall average thickness of the plate-shaped ribs is in the range of 0.8 to 2.8 mm, then these high shock absorbance characteristics can be maintained. If the average thickness is less than 0.8 mm, then, when the plate-shaped ribs are subjected to an impact, they can be easily pushed to the bottom onto the facer before sufficiently dampening the impact, and as a result it becomes difficult to sufficiently absorb and dampen the impact. On the other hand, if the average thickness is more than 2.8 mm, then the buckling strength of the plate-shaped ribs becomes too large, so that the impact acceleration when subjected to an impact becomes large, and it becomes difficult to maintain the required impact absorbance characteristics.

To efficiently absorb and dampen impacts with an inventive vehicle interior material of the above configuration, it is possible to mold the facer and the plate-shaped ribs in one piece by injection molding using the same thermoplastic resin, which greatly reduces costs compared to conventional materials, which employ the double injection molding method using different resins to increase the shock absorbance characteristics or provide a separate shock-absorbing material on the rear side of the facer in addition to the ribs.

The vehicle interior material of the present invention is preferably used as a center pillar garnish or a roof side rail garnish of a vehicle.

BRIEF DESCRIPTION OF THE DRAWINGS

FIG. 3(*a*) is a cross-sectional view of an alternative example of the first embodiment of the present invention, wherein the plate-shaped ribs of the pillar garnish are provided with a plurality of auxiliary notches.

FIG. 3(*b*) is a cross-sectional view of another alternative example of the first embodiment of the present invention, wherein the plate-shaped ribs of the pillar garnish are provided with a plurality of auxiliary notches.

FIG. 4(*a*) is a cross-sectional view of a pillar garnish in a second embodiment of the present invention that is attached to a vehicle panel as a vehicle interior material.

FIG. 4(*b*) is a cross-sectional view of an alternative example of the second embodiment of the present invention, wherein the plate-shaped ribs of the pillar garnish are Provided with a plurality of step portions.

FIG. 5(a) is a cross-sectional view of a pillar garnish in a third embodiment of the present invention that is attached to a vehicle panel as a vehicle interior material. FIG. 5(b) is a cross-sectional view of an alternative example of the third embodiment of the present invention, wherein the plate-shaped ribs of the pillar garnish are provided with a plurality of thin-walled portions.

FIG. 14 is a cross-sectional view of a center pillar garnish, which is a conventional vehicle interior material, that is attached to a vehicle panel.

FIG. 15 is a cross-sectional view of a center pillar garnish, which is a conventional vehicle interior material, that is attached to a vehicle panel.

DESCRIPTION OF THE PREFERRED EMBODIMENTS

The following is a detailed description of preferred embodiments of the present invention, with reference to the accompanying drawings. It should be understood that the scope of the present invention is in no way limited by these embodiments.

Figure 1:
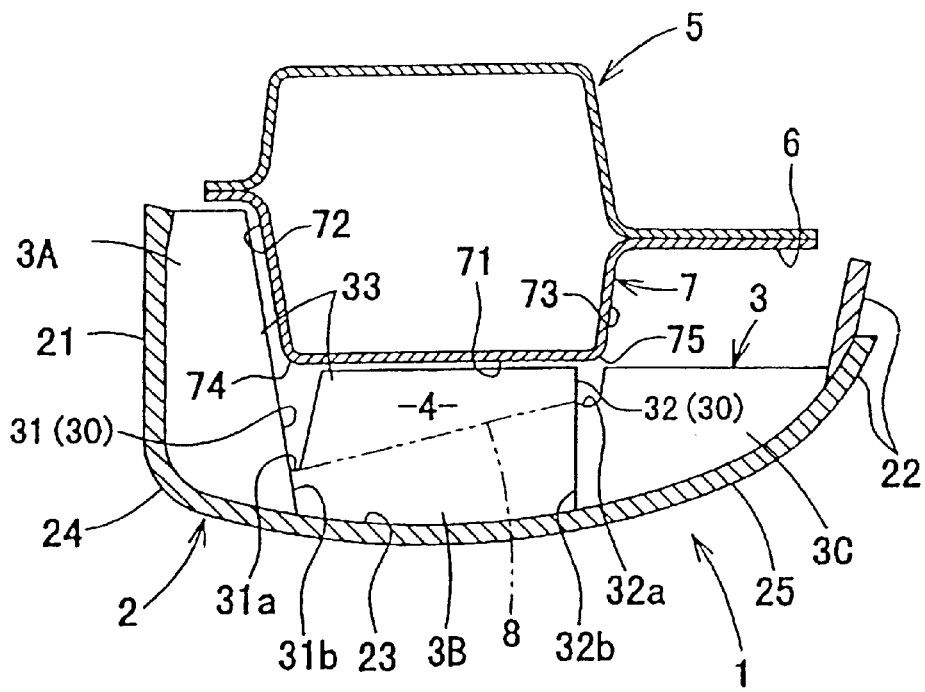
FIG. 1 is a cross-sectional view of a pillar garnish in a first embodiment of the present invention that is attached to a vehicle panel as a vehicle interior material.
Figure 2:
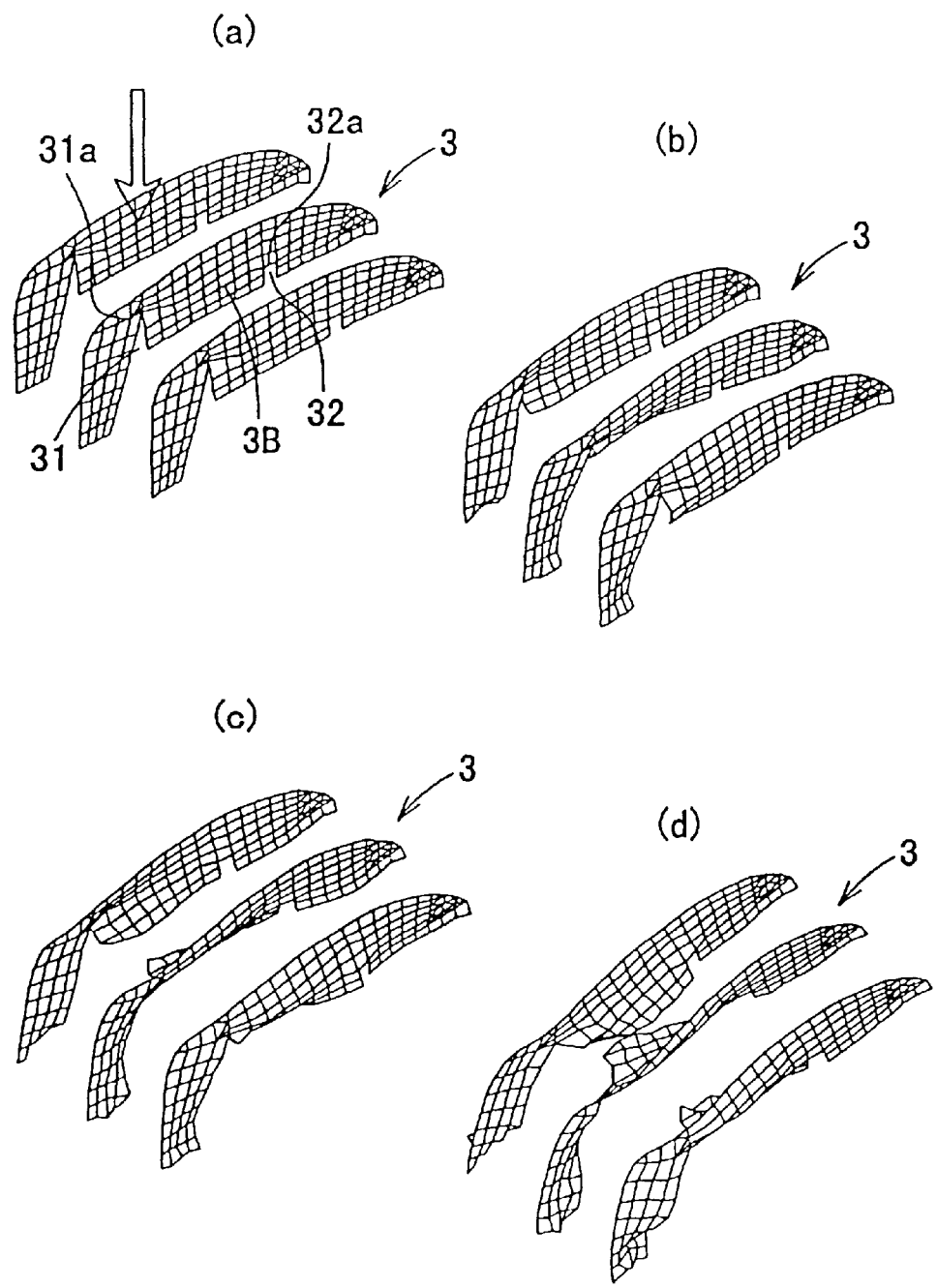
FIGS. 2(*a*) to (*d*) illustrate the impact absorbance behavior when a pillar garnish of the first embodiment of the present invention is subjected to an impact force.

FIG. 1 shows a diagram, in which a pillar garnish 1, which is a vehicle interior material in accordance with the present invention, is attached to a vehicle panel 5. FIGS. 1 to 3 illustrate a first embodiment, FIG. 4 illustrates a second embodiment, and FIG. 5 illustrates a third embodiment of the present invention. In these drawings, numeral 2 denotes a facer, and numeral 3 denotes a plate-shaped rib.

First of all, a pillar garnish in a first embodiment of the present invention is explained with reference to FIGS. 1 to 3.

The pillar garnish 1 includes a substantially C-shaped facer 2 and a plurality of plate-shaped ribs 3. The C-shaped facer 2 is made of a section 24 with a bent cross-section and a section 25 with a curved cross-section, which cover a panel ridge 7 with a shock-absorbing space 4 interposed between the facer 2 and the panel ridge 7. The panel ridge 7 has an end face 71 extending in longitudinal direction and two lateral faces 72 and 73 in continuation of the end face 71, and protrudes toward the vehicle compartment side as part of the inner panel 6, which constitutes the vehicle panel 5 of the front pillar portion. The plurality of plate-shaped ribs 3, which are arranged independently from one another, bridging the side walls 21 and 22 of the facer 2, protrude from the rear face 23 (arranged in opposition to the inner panel) of the facer 2 into the space 4, and intersect with the longitudinal direction of the inner panel 6. The pillar garnish 1 is fastened by fixing a fitting member to a fitting hole (not shown in the drawings) provided in the inner panel 6.

The shape of the protruding edges 33 of the plate-shaped ribs 3 substantially follows at least the protrusion end face 71 of the panel ridge 7 and the passenger-opposing lateral face 72 formed in continuation thereof to the side opposing the passengers. The plate-shaped ribs 3 comprise a deformation-inducing means 30, causing the rib portion 3B protruding towards the protrusion end face 71 of the panel ridge 7 to buckle at an intermediate protrusion position when the plate-shaped ribs 3 are subjected to an impact by a passenger. More specifically, the protruding edge 33 of the plate-shaped ribs 3 has a main notch 31 opened in opposition to the region 74 where the protrusion end face 71 of the panel ridge 7 abuts against the passenger-opposing lateral face 72 formed in continuation on one side thereof, and an auxiliary notch 32 opened in opposition to the region 75 where the protrusion end face 71 of the panel ridge 7 abuts against the lateral face 73 formed in continuation on the other side thereof. When the plate-shaped ribs 3 are subjected to an impact by a passenger, they buckle along the virtual line 8 connecting the bottom portions 31a and 32a, and depending on position, direction, and intensity of the impact, as well as material and dimensions of the interior material, the bottom portions 31a and 32a form the starting points of a crack toward the rear face 23 of the facer 2, and following the progression of these cracks, the virtual line 8 where the buckling is induced will shift.

It is preferable that the protruding edges 33 of the plate-shaped ribs 3 are provided with a plurality of auxiliary notches. FIG. 3(a) shows a plate-shaped rib 3 provided, in addition to the afore-mentioned auxiliary notch 32, with an auxiliary notch 32B, which is opened in the protruding edge 33 in the rib portion 3B protruding toward the protrusion end face 71 between the notch 32 and the main notch 31. FIG. 3(b) shows a plate-shaped rib 3 provided with an auxiliary notch 32C, which is opened in the protruding edge 33 in the rib portion 3C. In these drawings, the buckling is induced along the virtual lines 81 and 81B or 81 and 81C, respectively, and when a crack originates at the main notch 31 and the auxiliary notches 32, 32B, and 32C, the ends of the virtual lines can be expected to shift along the tip of the progressing cracks.

Being even more specific, virtual lines 31b and 32b extending from the bottom portion 31a of the main notch 31 and from the bottom portion 32a of the auxiliary notch 32 toward the rear face 23 of the facer 2 partition the plate-shaped ribs 3 into three rib portions 3A, 3B, and 3C of different thickness distribution and average thickness along the protrusion direction. The overall average thickness of the plate-shaped ribs 3 is set to 0.8 to 2.8 mm.

Providing virtual lines 31b and 32b with changing wall thickness, cracks are guided along the bounds of the wall thickness by the virtual lines when the pillar garnish is subjected to an impact by a passenger.

It is preferable that the depth of the main notch 31, formed near the passenger position which necessitates a higher shock-absorbing capability, is larger than that of the auxiliary notch 32, as shown in the drawings. To be specific, the main notch 31 is set to about ⅓ to ¾ of the rib protrusion height at this position, whereas the auxiliary notch 32 is set to about ¼ to ⅔ of the rib protrusion height at this position.

While there is no particular limitation to the specific shape of the notches 31 and 32, it is preferable that the bottom portions 31a and 32a are rounded to avoid excessive stress concentrations.

Furthermore, while there is no particular limitation on the depth direction and the opening angle of the notches 31 and 32, it is preferable that the depth direction of for example the main notch 31 is formed as obliquely towards the side wall 21 as the molding permits.

The pillar garnish 1 of the present invention, which does not include any vertical ribs, is made by melting a thermoplastic resin, such as an ABS resin, an AES resin, an AAS resin, a polyolefin resin such as polypropylene or polyethylene, a polystyrene resin, a polyester resin, a polyamide resin, a polycarbonate resin, or alloys thereof, and injection-molding the facer 2, the plate-shaped ribs 3 etc. in one piece. The thickness distribution and the average thickness of the plate-shaped ribs 3, and the notch angles of the notches can be adjusted as appropriate by choosing suitable die shapes for the molding.

According to the analysis shown in FIG. 2, which has been calculated under the assumption that no cracks occur, buckling of the rib portion 3B is induced gradually, as shown in FIGS. 2(a) to (d), along the virtual line connecting the bottom portion 31a of the main notch 31 and the bottom portion 32a of the auxiliary notch 32 due to the impact force applied during a vehicle collision by the passenger's head to the facer in the direction shown by the arrow. It can be seen that the impact can be absorbed with high efficiency.

The following is an explanation of a second embodiment of the present invention, with reference to FIG. 4.

As shown in FIG. 4(a), a pillar garnish 1 in this embodiment comprises, as a deformation-inducing means 30 causing the rib portion 3B protruding towards the protrusion end face 71 of the panel ridge 7 to buckle at an intermediate protrusion position when subjected to an impact by a passenger, a main notch 31 opened in the protruding edge 33 of the plate-shaped rib 3 in opposition to the region 74 where the protrusion end face 71 of the panel ridge 7 abuts against the passenger-opposing lateral face 72 formed in continuation on one side thereof, a step portion 36 provided in the same protruding edge 33 in opposition to the region 75 where the protrusion end face 71 of the panel ridge 7 abuts against the lateral face 73 formed in continuation on the other side thereof, and a step portion 36B provided in the rib portion 3B between the step portion 36 and the main notch 31. When the plate-shaped ribs 3 are subjected to an impact by a passenger, they are induced to buckle along the virtual line 82 connecting the bottom portion 31a of the main notch 31 and the bottom portion 37 of the step portion 36, as well as along the virtual line 82B connecting the bottom portion 31a and the bottom portion 37B of the step portion 36B. The bottom portions 37 and 37B form the starting points of cracks toward the facer 2, and, as in the first embodiment, it can be expected that the ends of the virtual lines shift with the tips of the progression of these cracks.

As for the auxiliary notch In the first embodiment, the depth of the step portions 36 and 36B is about ¼ to ⅔ of the rib protrusion height at these positions, and their depth is smaller than that of the main notch 31.

It is possible to provide the plate-shaped ribs with one step portion, but it is also preferable to provide them with a step portion 36C at the rib portion C instead of the step portion 36B, as shown in FIG. 4(b).

The other aspects of this embodiment are basically the same as in the first embodiment, so that same elements are denoted by the same numerals and their further explanation has been omitted.

The following is an explanation of a third embodiment of the present invention, with reference to FIG. 5.

As shown in FIG. 5(a), a pillar garnish 1 in this embodiment comprises, as a deformation-inducing means 30, a main notch 31 opened in the protruding edge 33 of the plate-shaped ribs 3 in opposition to the region 74 where the protrusion end face 71 of the panel ridge 7 abuts against the passenger-opposing lateral face 72 formed in continuation on one side thereof, and a thin-walled portion 35 provided in the same protruding edge 33 in opposition to the region 75 where the protrusion end face 71 of the panel ridge 7 abuts against the lateral face 73 formed in continuation on the other side thereof. When the plate-shaped ribs 3 are subjected to an impact by a passenger, a crack forms at the thin-walled portion 35, and they are induced to buckle along the virtual line 83 connecting the bottom portion 31a of the main notch 31 and the bottom portion 35a of the thin-walled portion 35. The bottom portions 31a and 35a become starting points of cracks toward the facer 2, and, as in the first embodiment, it can be expected that the ends of the virtual line 83 shift with the progression of these cracks.

As shown In FIG. 5(b), It is also possible to provide a plurality of thin-walled portions, and it is also preferable to provide a main thin-walled portion 34 instead of the main notch 31 and having substantially the same cross-section as the main notch 31. When such a interior material is subjected to an impact by a passenger, cracks are formed at the main thin-walled portion 34 and the other thin-walled portions 35 and 35B, and the plate-shaped ribs 3 buckle along the virtual lines 83 and 83B.

The other aspects of this embodiment are basically the same as in the first embodiment, so that same elements are denoted by the same numerals and their further explanation has been omitted.

EXAMPLES

Figure 6:
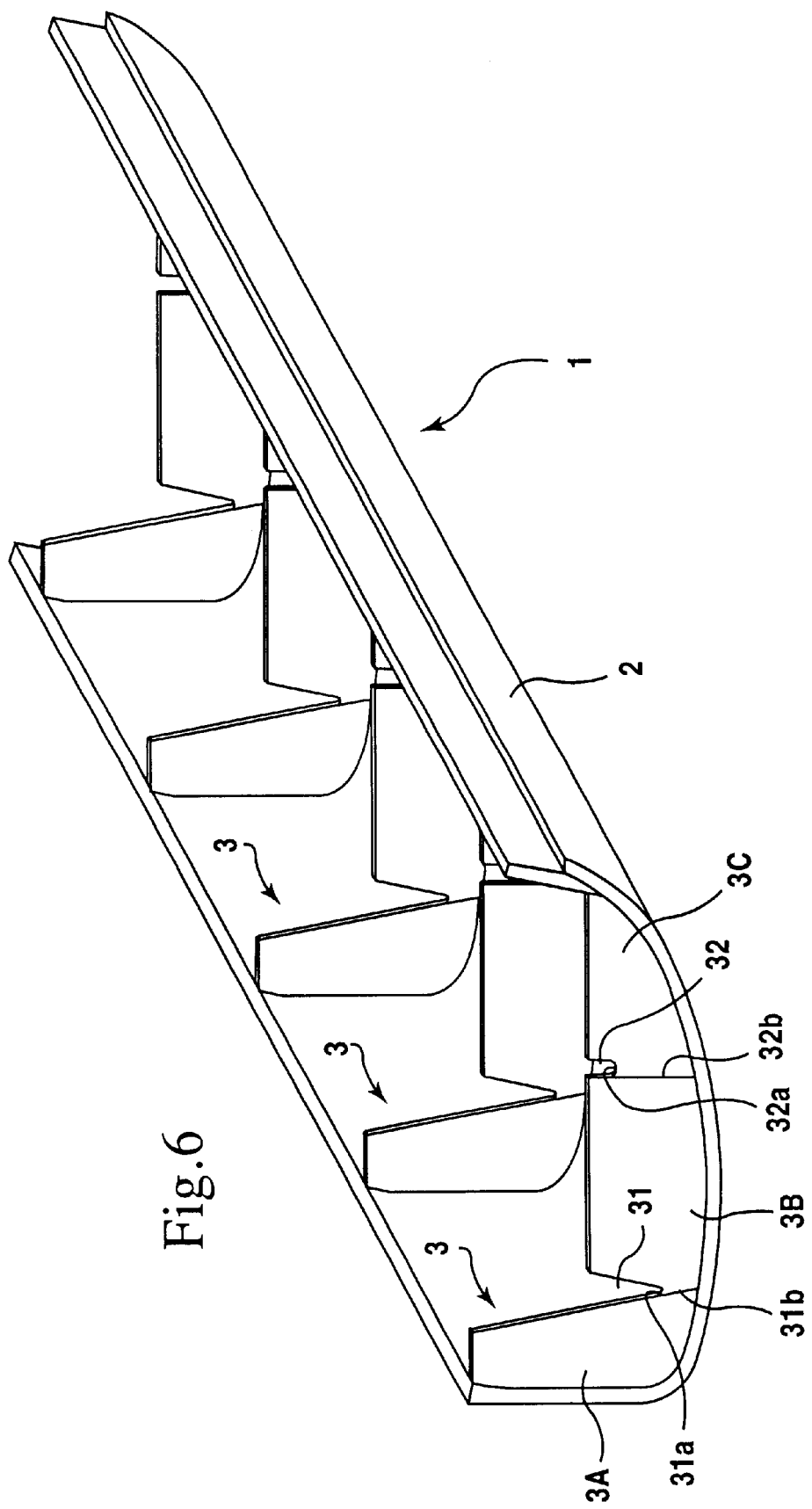
FIG. 6 is a perspective view showing the front pillar garnish of Examples 1 to 4.
Figure 8:
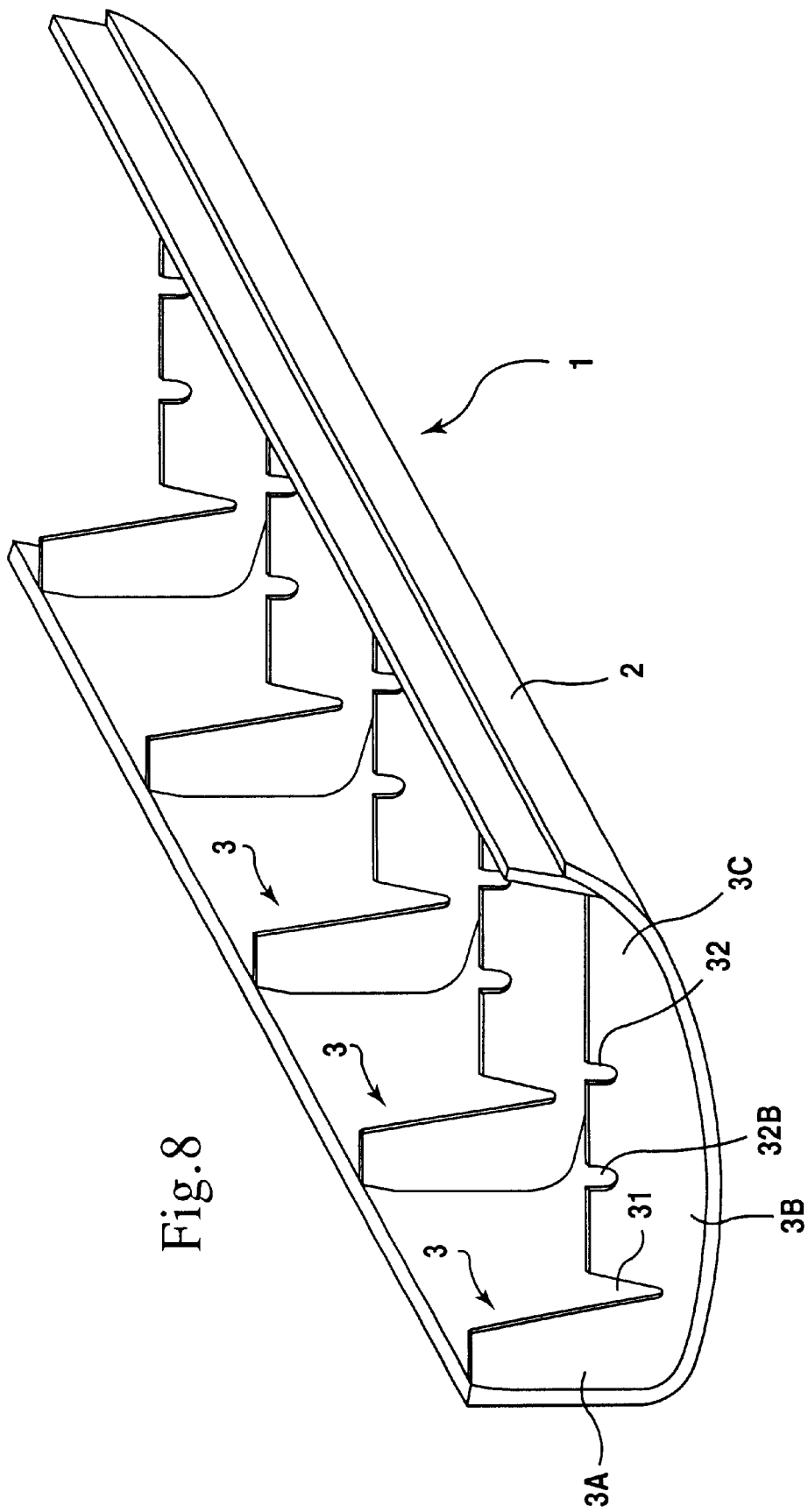
FIG. 8 is a perspective view showing the front pillar garnish of Example 5.
Figure 9:
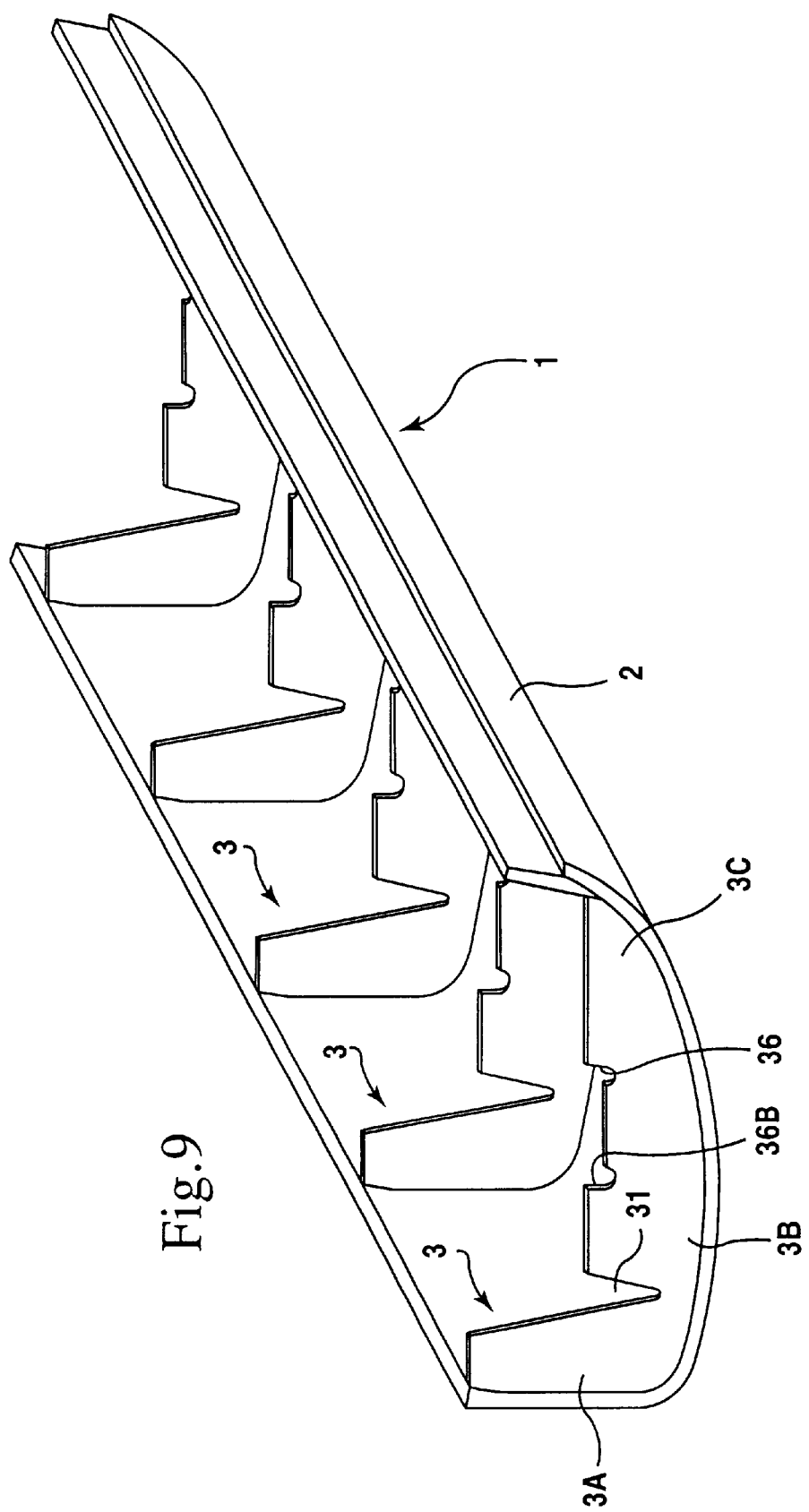
FIG. 9 is a perspective view showing the front pillar garnish of Example 6.
Figure 10:
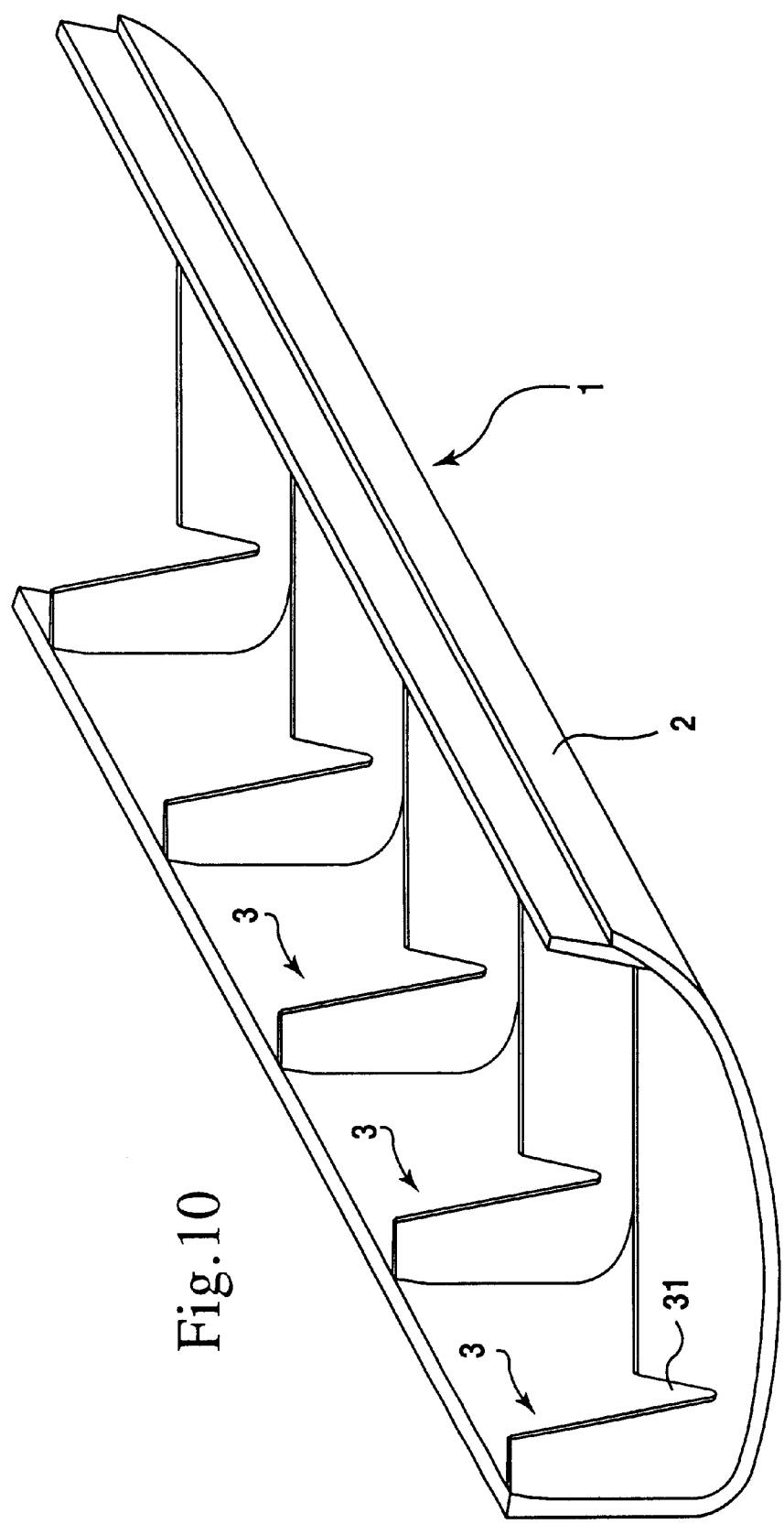
FIG. 10 is a perspective view showing the front pillar garnish of Comparative Examples 1 to 4.
Figure 11:
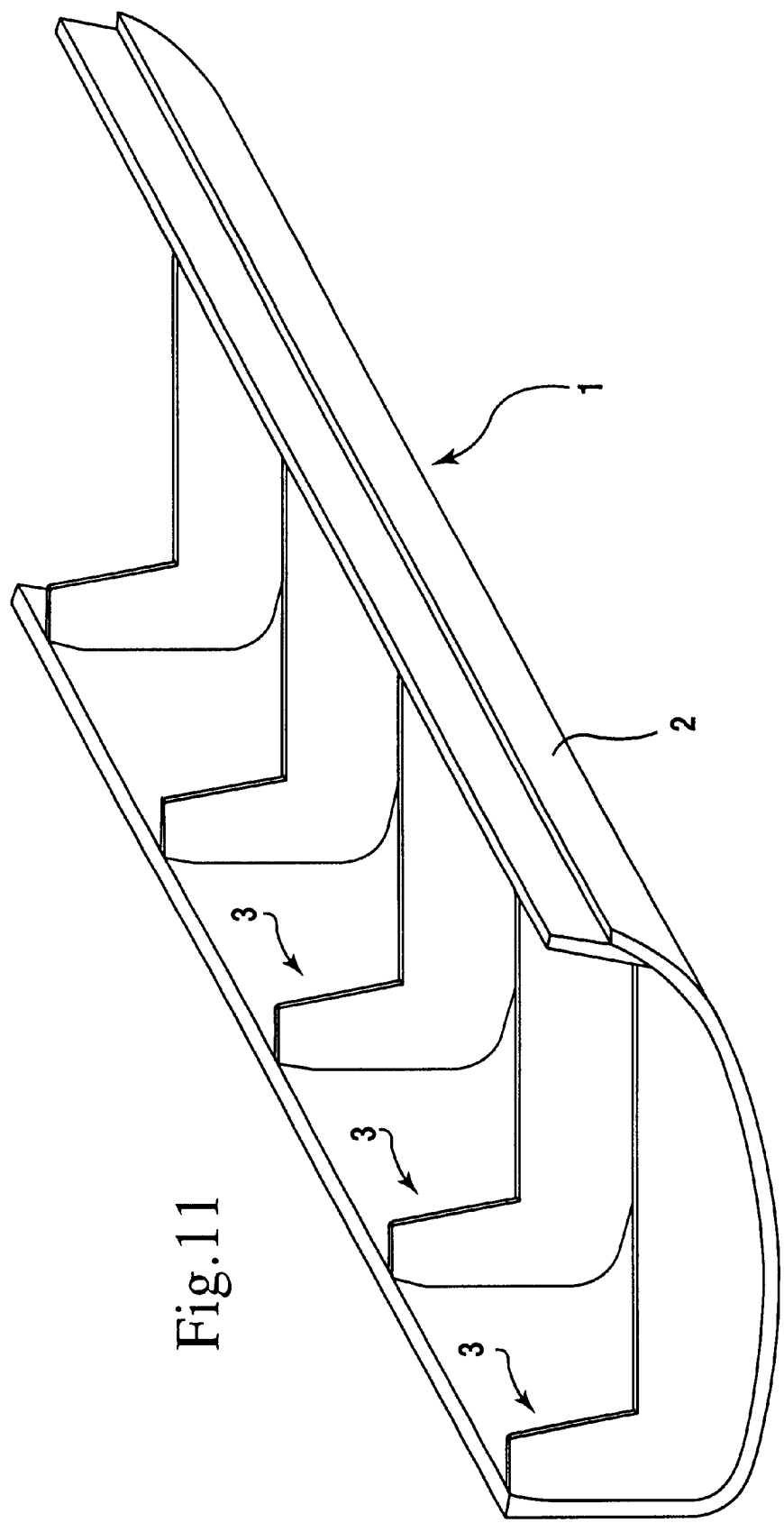
FIG. 11 is a perspective view showing the front pillar garnish of Comparative Examples 5 to 8.
Figure 12:
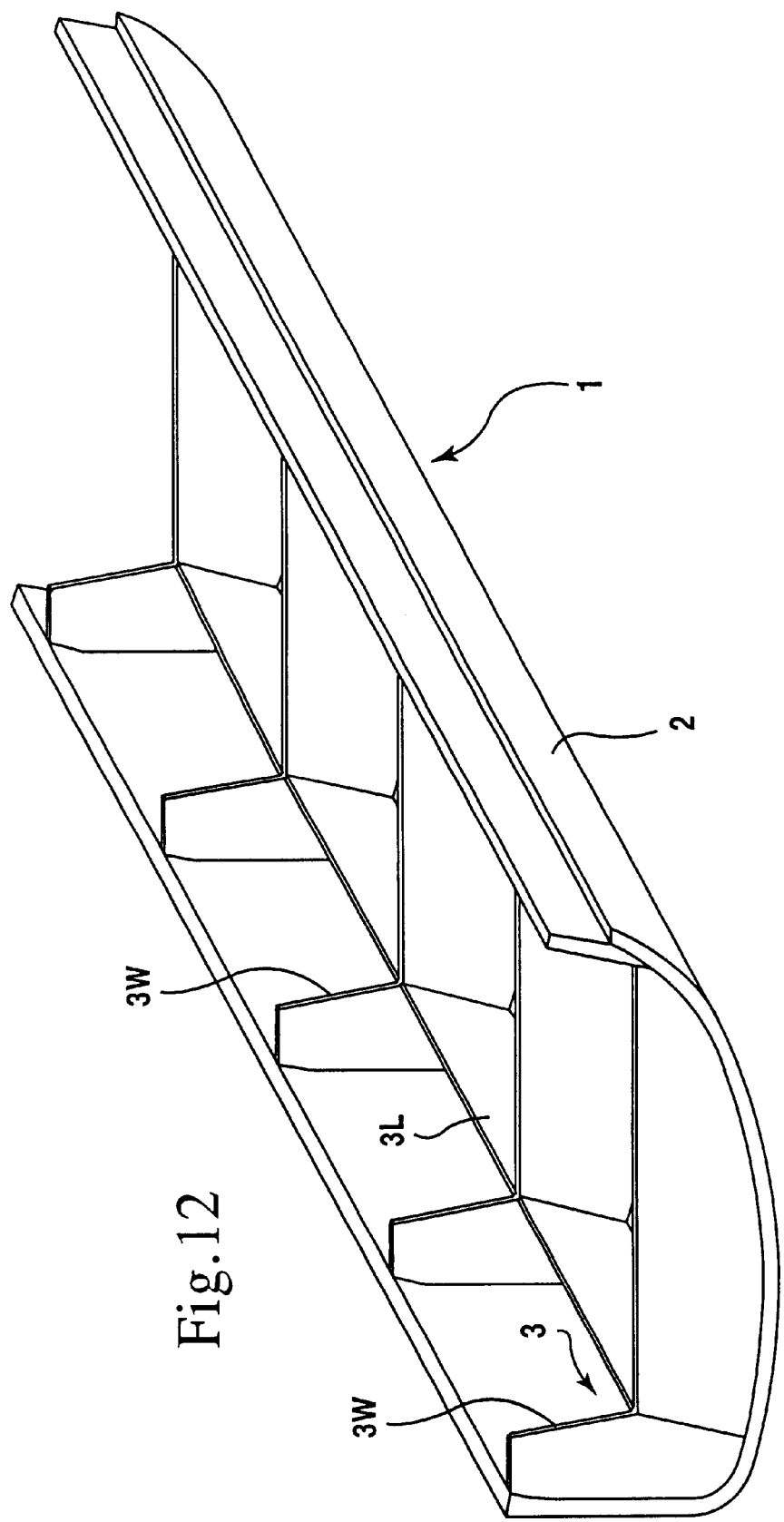
FIG. 12 is a perspective view showing the front pillar garnish of Comparative Examples 9 to 12.
Figure 13:
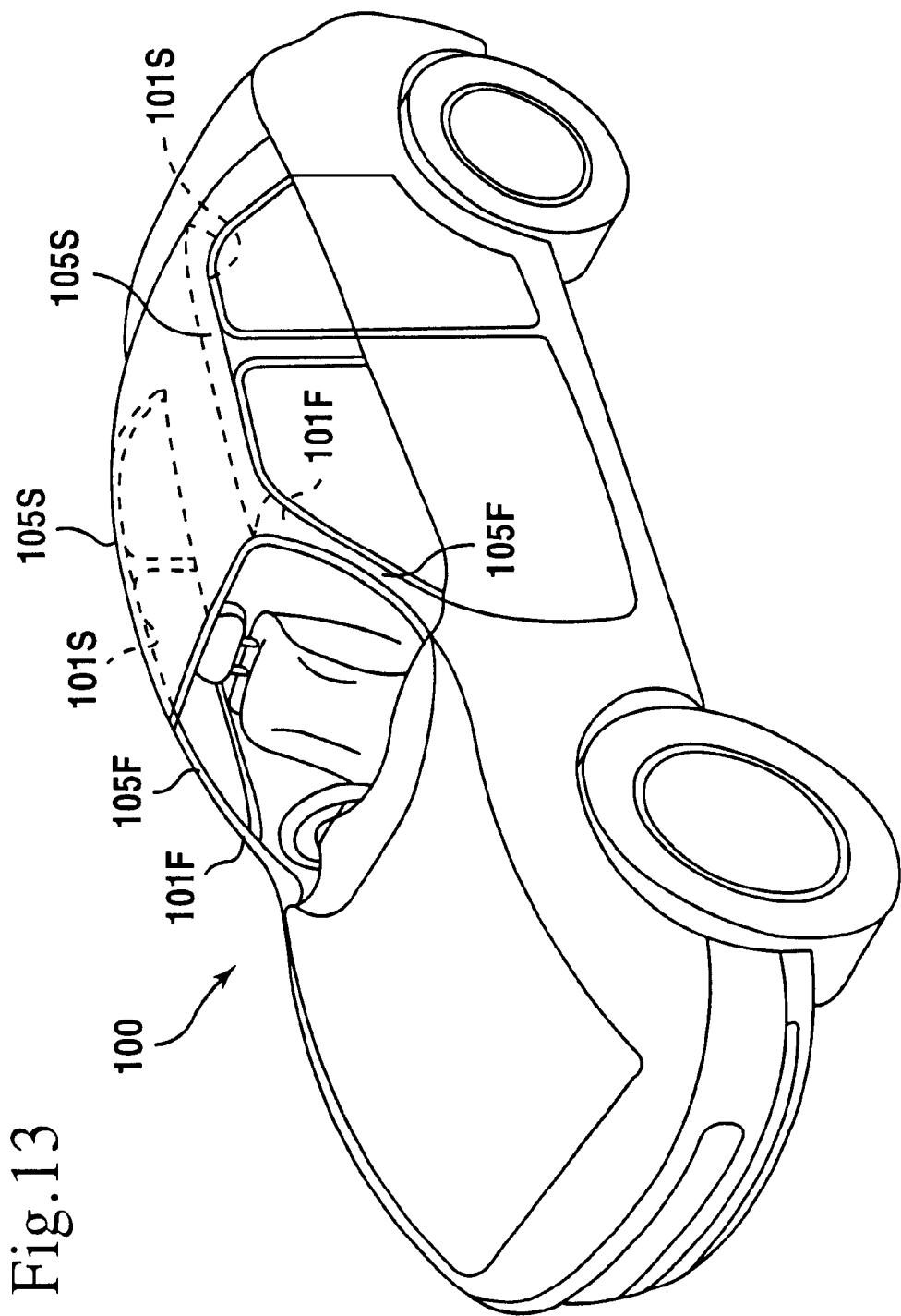
FIG. 13 is a diagram illustrating a vehicle interior material attached to the parts of a vehicle.

The following is an explanation of the impact test performed on an Example 1 shown in FIG. 6, and of numerical tests performed on front pillar garnishes 1 in Examples 1 to 4, shown in FIG. 6, Example 5 shown in FIG. 8, Example 6 shown in FIG. 9, Comparative Examples 1 to 4 shown in FIG. 10, Comparative Examples 5 to 8 shown in FIG. 11, and Comparative Examples 9 to 12 shown in FIG. 12.

The maximum protrusion height of the plate-shaped ribs 3 in the examples and the comparative examples has been set uniformly to about 17 mm.
Impact Test The structure of the front pillar garnish 1 shown in FIG. 6 is the same as in the above-described first embodiment, and the maximum protrusion height of the plate-shaped ribs 3 has been set to about 17 mm.

In Example 1, the average thickness of the rib portions 3A, 3B, and 3C that are partitioned by the virtual lines 31b and 32b extending from the bottom portions 31a and 32a of the main notch 31 and the auxiliary notch 32 toward the facer 2 is 1.8 mm, 1.8 mm and 1.2 mm, respectively, and the thickness distribution of the rib portions 3A and 3B along the protrusion direction differs among the examples.

Figure 7:
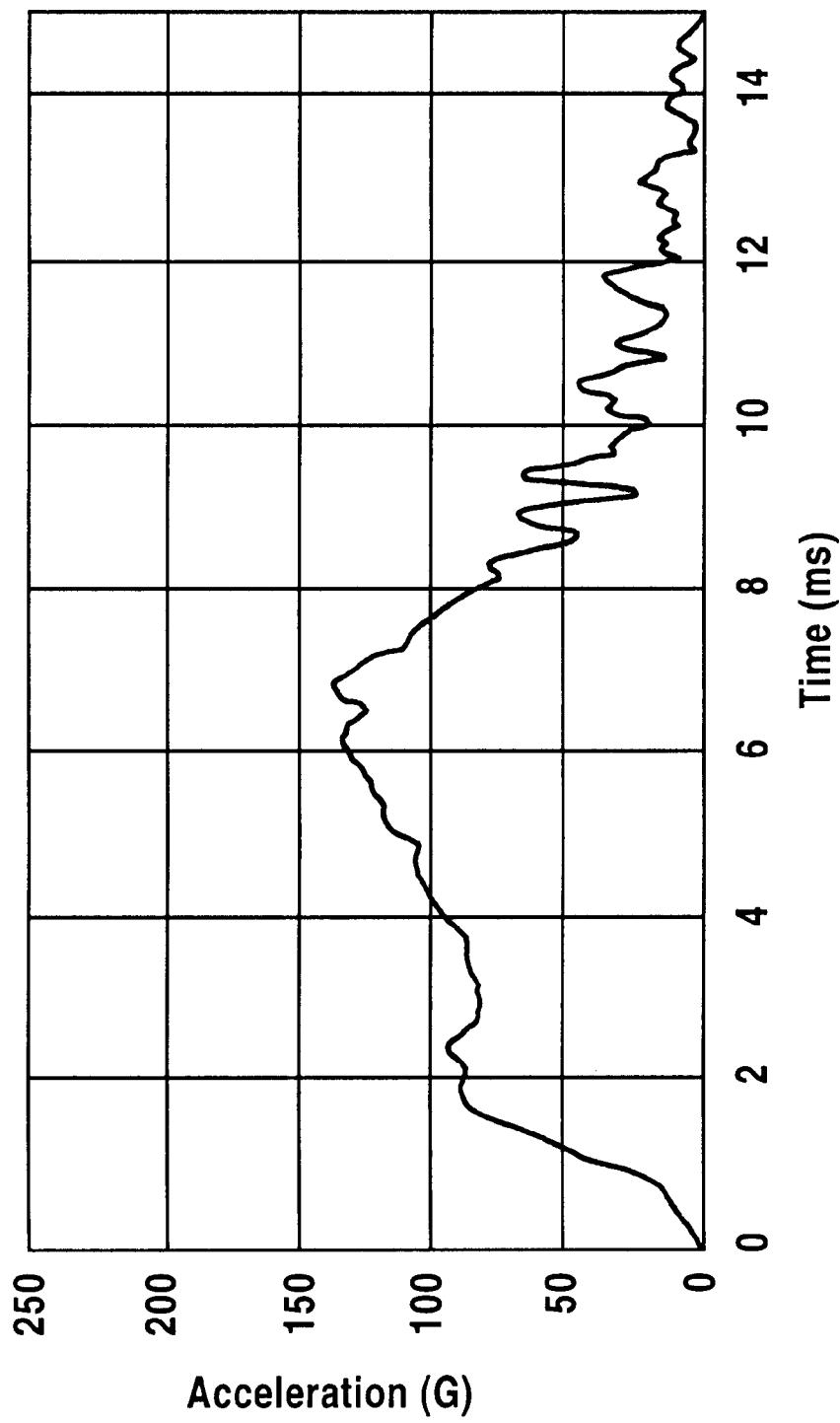
FIG. 7 is a graph showing the results of an impact test performed on the front pillar garnish of Example 1. The vertical axis marks gravitational acceleration (G) and the horizontal axis marks time (ms).

For the impact test, the applicant's own drop impact test device was used, and while turning over the pillar garnish 1 of Example 1 shown in FIG. 6, a falling weight of 4.6 kg mass and 165 mm having a spherical impact surface was caused to collide at a collision speed of 24 km/h with the facer 2 at a position near the passenger. FIG. 7 is a graph showing the measured gravitational acceleration applied on the pillar garnish 1 at the time of impact.

According to FIG. 7, the growth rate of the impact acceleration decreases beyond 2 ms after the begin of the impact, and it can be appreciated that the impact is absorbed with high efficiency, keeping the acceleration below 135G. That is to say, it can be seen that the ribs break continuously in several stages, and the graph in FIG. 7 describes a curve that resembles a trapezoidal waveform.

Numerical Test

FIG. 6 illustrates the front pillar garnishes 1 of the Examples 1 to 4, whose structure is the same as that of the first embodiment described above. The average thickness of the rib portions 3A, 3B, and 3C that are partitioned by the virtual lines 31b and 32b differs among the examples, and is shown in Table 1.

TABLE 1

| front pillar garnish | thickness of rib portion 3A (mm) | thickness of rib portion 3B (mm) | thickness of rib portion 3C (mm) |
| --- | --- | --- | --- |
| Example 1 | 1.8 | 1.8 | 1.2 |
| Example 2 | 1.2 | 1.2 | 1.2 |
| Example 3 | 1.2 | 2.2 | 2.2 |
| Example 4 | 0.8 | 1.8 | 0.8 |

FIG. 8 illustrates the front pillar garnish 1 of Example 5, whose structure is the same as that of the alternative example in the first embodiment described above, wherein, besides the auxiliary notch 32, another auxiliary notch 32B is provided in the rib portion 3B between the auxiliary notch 32B and the main notch 31. The thickness of the rib portions 3A, 3B, and 3C is set substantially uniformly to an average 1.8 mm.

FIG. 9 illustrates the front pillar garnish 1 of Example 6, whose structure is the same as that of the second embodiment described above, which is provided with a main notch 31, a step portion 36 and a step portion 36B. The thickness of the rib portions 3A, 3B, and 3C is set substantially uniformly to an average 1.8 mm.

FIG. 10 illustrates the front pillar garnish 1 of the Comparative Examples 1 to 4, whose structure corresponds to that of the above-described Example 1 shown in FIG. 6 from whose plate-shaped ribs 3 the auxiliary notches 32 have been omitted and wherein the thickness of the plate-shaped ribs 3 is substantially uniform. The thickness of the plate-shaped ribs 3 differs among the examples and is listed in Table 2.

TABLE 2

| front pillar garnish | thickness of plate-shaped ribs 3 (mm) |
| --- | --- |
| Comp. Example 1 | 1.8 |
| Comp. Example 2 | 1.2 |
| Comp. Example 3 | 2.2 |
| Comp. Example 4 | 0.8 |

FIG. 11 illustrates the front pillar garnishes 1 of the Comparative Examples 5 to 8, whose structure corresponds to that of the above-described Example 1 shown in FIG. 6 from whose plate-shaped ribs 3 the main notches 31 and the auxiliary notches 32 have been omitted and wherein the thickness of the plate-shaped ribs 3 is substantially uniform. The thickness of the plate-shaped ribs 3 differs among the examples and is listed in Table 3.

TABLE 3

| front pillar garnish | thickness of plate-shaped ribs 3 (mm) |
| --- | --- |
| Comp. Example 5 | 1.8 |
| Comp. Example 6 | 1.2 |

TABLE 3-continued

| front pillar garnish | thickness of plate-shaped ribs 3 (mm) |
| --- | --- |
| Comp. Example 7 | 2.2 |
| Comp. Example 8 | 0.8 |

FIG. 12 illustrates the front pillar garnish 1 of the Comparative Examples 9 to 12, whose structure corresponds to that of the prior art, provided with a lattice of vertical and horizontal plate-shaped ribs 3L and 3W. The thickness of the plate-shaped ribs 3L and 3W differs among the examples and is listed in Table 4.

TABLE 4

| front pillar garnish | thickness of plate-shaped ribs 3 (mm) |
| --- | --- |
| Comp. Example 9 | 1.8 |
| Comp. Example 10 | 1.2 |
| Comp. Example 11 | 2.2 |
| Comp. Example 12 | 0.8 |

The numerical tests were performed with impact test analysis software LS-DYNA (by Livermore Software Technology Corporation), and, taking the value of HIC(d) for the impact analysis of the Examples 1 to 4 as 100, the determined ratios of HIC(d) of the Examples 5 and 6 and of the Comparative Examples 1 to 12 with the corresponding thicknesses are shown in the Tables 5 to 8.

The numerical value of HIC(d) of the Examples 1 to 4 was 934 for Example 1, 923 for Example 2, 814 for Example 3 and 795 for Example 4, that is, below 1000 in each of these examples.

TABLE 5

| front pillar garnish | ratio of HIC(d) to Example 1 |
| --- | --- |
| Example 1 | 100 |
| Example 5 | 102 |
| Example 6 | 105 |
| Comp. Example 1 | 108 |
| Comp. Example 5 | 143 |
| Comp. Example 9 | 187 |

TABLE 6

| front pillar garnish | ratio of HIC(d) to Example 2 |
| --- | --- |
| Example 2 | 100 |
| Comp. Example 2 | 105 |
| Comp. Example 6 | 110 |
| Comp. Example 10 | 136 |

TABLE 7

| front pillar garnish | ratio of HIC(d) to Example 3 |
| --- | --- |
| Example 3 | 100 |
| Comp. Example 3 | 129 |
| Comp. Example 7 | 184 |
| Comp. Example 11 | 253 |

TABLE 8

| front pillar garnish | ratio of HIC(d) to Example 4 |
|---|---|
| Example 4 | 100 |
| Comp. Example 4 | 145 |
| Comp. Example 8 | 130 |
| Comp. Example 12 | 121 |

According to Table 5, which compares front pillar garnishes 1 wherein the average thickness of the plate-shaped ribs is substantially 1.8 mm, the ratio of the HIC(d) for Example 5, which is provided with a plurality of auxiliary notches 32 and 32B, increases 2%, and the ratio of the HIC(d) for Example 6, which is provided with the step portions 36 and 36B, increases 5%, so that in both cases the increase is below 5%. The HIC(d) ratio for the Comparative Example 1, which is provided only with the main notch 31, increases 8%, and for the Comparative Example 5, which has no notches, a large increase of 43% can be observed, whereas for the Comparative Example 9, in which lattice-shaped ribs are formed, an even larger increase of 87% can be observed.

According to Table 6, which compares front pillar garnishes 1 with a thinner average thickness of the plate-shaped ribs 3 of substantially 1.2 mm, the ratio of the HIC(d) for the comparative examples according to these different structures shows substantially the same tendency as the results of Table 5 in which the average thickness was substantially 1.8 mm, although the growth ratio of the HIC(d) was a little smaller.

According to Table 7, which compares front pillar garnishes 1 with a thicker average thickness of the plate-shaped ribs 3 of substantially 2.2 mm, the same increasing tendency as in the results of Table 5 in which the average thickness was substantially 1.8 mm can be observed, and the ratio of the HIC(d) of the comparative examples according to these different structures became extremely large. It can be seen that the larger the average thickness of the plate-shaped ribs is, the more significant does the effect become that impacts are absorbed with high efficiency by providing a plurality of notches.

According to Table 8, which compares front pillar garnishes 1 with an extremely thin average thickness of the plate-shaped ribs 3 of substantially 0.8 mm, very different results are obtained than with the results of Table 5 in which the average thickness was substantially 1.8 mm. The reason for this is that when the thickness becomes too thin, the buckling strength of the ribs becomes extremely low, so that when the plate-shaped ribs are subjected to an impact force, they are easily pressed against the vehicle panels, and it can be seen that in Comparative Example 4, which is provided with only one notch, the HIC(d) ratio becomes largest, lowering the shock-absorbing capability.

With this vehicle interior material, the plate-shaped ribs are independent from one another, so that the decrease of the actual impact absorption stroke due to overlapping of the ribs can be prevented, while the deformation-inducing means with which the ribs are provided cause multi-stage deformation and break-down starting the buckling at an intermediate portion of the ribs before the ribs buckle along the protrusion base end, the protrusion height of the plate-shaped ribs can be curbed to about 17 mm or less and the plate-shaped ribs display efficient shock-absorbing characteristics maintaining a low impact acceleration of HIC(d) 100 or less, so that good shock-absorbance characteristics can be maintained in a limited space.

In particular, when the deformation-inducing means includes a main notch opened in opposition to a region where the protrusion end face of the panel ridge abuts against the passenger-opposing lateral face formed in continuation on one side thereof or a thin-walled portion with the same cross-section as this main notch, and at least one auxiliary notch, step portion or thin-walled portion in opposition to or nearly opposite the region where the protrusion end face of the panel ridge abuts against the lateral face formed in continuation on the other side thereof, then the buckling of the ribs is induced at an intermediate protrusion position of the plate-shaped ribs, and the bottom portions of these structural portions become the starting points for cracks, contributing to a more efficient shock absorbance.

When at least one virtual line extending from at least one structural portion of the deformation-inducing means toward the facer partitions the plate-shaped ribs into at least two portions of different thickness distribution along a protrusion direction and different average thickness, and the overall average thickness of the plate-shaped ribs is in the range of 0.8 to 2.8 mm, then the shock absorbance characteristics of the plate-shaped ribs can be adjusted even freer, and impact forces can be dampened efficiently in the space limited by the vehicle panel and the facer.

When the facer and the plate-shaped ribs of the vehicle interior material of the present invention are made in one piece by injection molding using the same thermoplastic resin, costs are greatly reduced compared to conventional materials, which employ the double injection molding method using different resins to increase the shock absorbance characteristics or provide a separate shock-absorbing material on the rear side of the facer in addition to the ribs.

What is claimed is:

1. A vehicle interior material, comprising:
a facer with a substantially C-shaped cross-section covering a panel ridge on a vehicle compartment side of a vehicle panel, the panel ridge having a protrusion end face extending in a longitudinal direction and two lateral faces in continuation of the end face, a space being provided between the panel ridge and the facer; and a plurality of plate-shaped ribs, which are arranged independently from one another, each of the plate-shaped ribs extending in a lateral direction of the vehicle panel to bridge side walls of the facer, the ribs protruding from a rear face of the facer opposing the vehicle panel into the space and intersecting with the longitudinal direction of the vehicle panel;

wherein the shape of a protruding edge of the plate-shaped ribs substantially follows at least a protrusion end face of the panel ridge and the passenger-opposing lateral face formed in continuation thereof to one side; and wherein the vehicle interior material further comprises a deformation-including means, causing a portion of the plate-shaped ribs protruding towards the protrusion end face of the panel ridge to buckle at an intermediate protrusion position when subjected to an impact by a passenger.

2. A vehicle interior material, comprising:
a facer with a substantially C-shaped cross-section covering a panel ridge on a vehicle compartment side of a vehicle panel, the panel ridge having a protrusion end face extending in a longitudinal direction and two lateral faces in continuation of the end face, a space being provided between the panel ridge and the facer; and a plurality of ribs, which are arranged independently from one another, bridging side walls of the facer, the ribs protruding from a rear face of the facer opposing the vehicle panel into the space and intersecting with the longitudinal direction of the vehicle panel;

wherein the shape of a protruding edge of the plate-shaped ribs substantially follows at least a protrusion end face of the panel ridge and the passenger-opposing lateral face formed in continuation thereof to one side, the vehicle interior material further comprises a deformation-including means, causing a portion of the plate-shaped ribs protruding towards the protrusion end face of the panel ridge to buckle at an intermediate protrusion position when subjected to an impact by a passenger, and the deformation-inducing means comprises a main notch opened in the protruding edge of the plate-shaped ribs in opposition to a region where the protrusion end face of the panel ridge abuts against the passenger-opposing lateral face formed in continuation on one side thereof, and at least one auxiliary notch provided in the protruding edge of the plate-shaped ribs in opposition to or nearly opposite the region where the protrusion end face of the panel ridge abuts against the lateral face formed in continuation on the other side thereof.

3. The vehicle interior material of claim 2, provided with a thin-walled portion instead of the main notch, the thin-walled portion having the same cross-section as the main notch.

4. The vehicle interior material of claim 2 or 3, wherein each of the plate-shaped ribs is partitioned, by a virtual line extending from the structural portion of the deformation-inducing means toward the facer, into at least two portions of different thickness distribution along a protrusion direction and different average thickness, an overall average thickness of the plate-shaped ribs being in the range of 0.8 to 2.8 mm.

5. The vehicle interior material of claim 2 or 3, wherein the facer and the plate-shaped ribs are integrated by injection molding using the same kind of thermoplastic resin.

6. The vehicle interior material of any of claims 1, 2 or 3, used as a center pillar garnish or a roof side rail garnish of an automobile.

* * * * *